Figure 1:
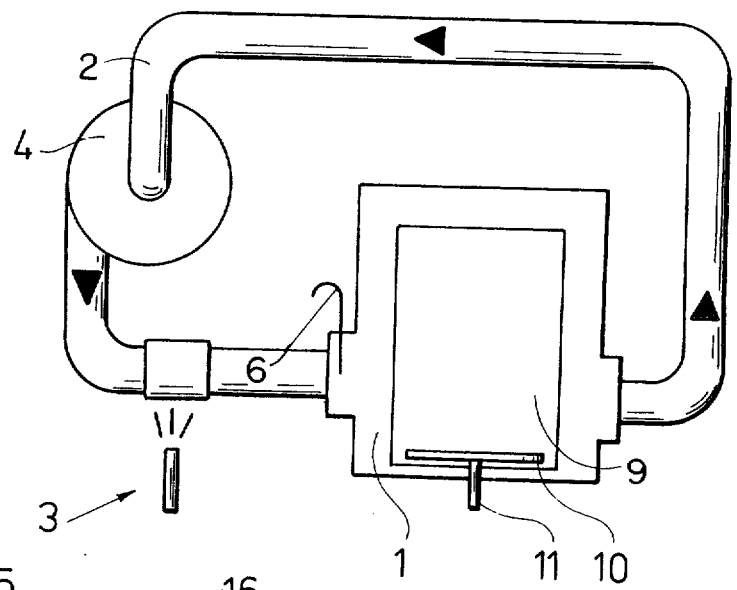

United States Patent [19]
Saario

[11] 3,887,266
[45] June 3, 1975

[54] CIRCULATING AIR OVEN

[76] Inventor: Pekka Juhani Saario, Martinkatu 31, Hyvinkaa, Finland

[22] Filed: Dec. 28, 1973

[21] Appl. No.: 429,173

[30] Foreign Application Priority Data
Oct. 16, 1973 Finland.............................. 3204/73

[52] U.S. Cl................................ 432/152; 126/289
[51] Int. Cl............................................ F27b 17/00
[58] Field of Search ....... 432/48, 152, 57, 120, 144; 126/289

[56] References Cited
UNITED STATES PATENTS
2,080,719  5/1937  Hovlis.................................. 432/48
3,517,916  6/1970  Ross et al. .......................... 432/48
3,537,405  11/1970  Verhoeven................... 432/152 X Primary Examiner—John J. Camby

[57] ABSTRACT

A circulating air oven for the baking of bakery products in flowing hot air, in which oven the air circulates in an air space constituted by the baking space and a circulating air duct and which oven comprises a circulating air heater and a circulating air blower with a drive motor. The oven furthermore comprises an air circulation control mechanism, such as a shut-off valve or a throttle, which is disposed in the air space of the oven so that the circulating air duct is controllable in order to control the air circulation in the baking space.

3 Claims, 2 Drawing Figures

CIRCULATING AIR OVEN

Circulating air ovens are commonly used in bakeries. The products to be baked are usually introduced into the oven with a so-called rack wagon, upon the plates or trays of which the products are also baked in the oven. It is common practice to rotate the rack wagons during the baking process or to move them otherwise with the aid of particular machinery, so that the products will be evenly baked on all sides.

Circulating air ovens have usually been arranged to operate automatically so that on operating of the oven door either for removal of products from the oven or for their insertion therein, the electric supply to the drive motor of the circulating air blower automatically cuts off and the motor becomes stationary. In that case, the blower still continues to operate for some time prior to becoming completely stationary, owing to the inertia of the circulating air blower's rotation. The duration of the blower's continued rotation after disconnecting its supply is several tens of seconds or even several minutes. During this period the blower circulates the baking air in the air space of the oven, in which situation there is, naturally, exchange of air through the door. This air exchange due to the inertia of the blower's rotation constitutes a major problem particularly in connection with the insertion of products to be baked into the oven. This is because together with the air welling out from the oven also a considerable amount of water vapor is expelled, that is, the humidity of the baking air will go down. This has the objectionable consequence of drying out the products in the baking phase proper, the air which has dried in connection with the opening of the door causing powerful evaporation of moisture from the products in the baking process. This is particularly true for white bread, French loaves, breakfast rolls or buns etc. which are bakery products at the baking of which endeavours are observed to maintain the water vapor content of the baking air at a relatively high level, i.e. at the saturation point or even higher. This is because by the high humidity of the baking air at the initial phase of the baking process condensation of moisture on the surface of the products is caused, which in its turn results in tasty products having a crisp skin.

Furthermore the hot baking air, which may have a temperature even as high as 300°C, introduces a direct factor endangering the baker when it emerges from the oven as the door is opened and hits his face.

The hot air mass escaping from the oven on opening the door also causes considerable losses of heat, which are quite appreciable owing to the high heat content which is due to the great quantity of water vapor present in the baking air.

It may further be noted that the wait for the circulating air blower to stop after the electric supply of its drive motor has been disconnected implies harmful and uneconomical interruptions of the production and slows it down.

An object of the present invention is to eliminate these drawbacks. The invention is characterized in that the oven comprises an air circulation control means, such as a shut-off means or a throttle, so fitted into the air space of the oven that with its aid the circulating air duct is controllable in order to control the air circulation in the baking space.

It is then possible to control, and even to stop, the air circulation in the baking space in an oven according to the invention when the door is opened, whereby the exchange of air taking place through it and the lowering of humidity of the baking air are not as detrimental as they have been in circulating air ovens of the prior art. Accordingly, the humidity of the baking air can be maintained within desired limits and at a rather high level, as is indispensable in connection with the baking of French bread, breakfast rolls or buns and equivalent bakery products. Furthermore, the circulating air oven according to the invention considerably promotes the safety at work of the baker in that it eliminates the danger of hot air from the oven striking his face. In addition, the heat losses in connection with the baking process are reduced thanks to the invention, and the baking operation may proceed without interruptions.

The air circulation control means according to the invention may naturally be placed at any point in the air space of the oven, even in the baking space. It is essential that with its aid the circulating air duct can be controlled for control of the air circulation in the baking space. It is also immaterial what kind of control means is employed: the control means may be any kind of means known in itself, such as an automatic valve, a thermal valve, a slide valve, a damper or any equivalent means.

In an advantageous embodiment of the invention, the control means consists of a shut-off means. Said shut-off means then naturally totally inhibits the air circulation in the baking space, whereby in the baking space no air circulation whatsoever occurs except for the self-induced movements of air caused by thermal motion.

In another advantageous embodiment of the invention, the control means is placed in the part of the circulating air duct conducting air into the baking space. In that case the air circulation in the baking space is immediately and directly controllable by the aid of said means, whereby also it is not absolutely necessary at all to stop the operation of the blower or its drive motor and of the circulating air heater when the door of the baking space is opened.

In a third advantageous embodiment of the invention, the circulating air duct comprises a by-pass pipe connecting the delivery and intake sides of the blower, and a control means is fitted in said by-pass. It is then fully possible to manage without closing the circulating air duct substantially totally if the control means in the by-pass is adjusted to maximum, whereby the air will circulate in the partially open air circulation system constituted by the blower and by-pass tube. This is particularly true when the flow resistance in the by-pass pipes is as low as possible, as a result of which very little air, if any, circulates in the circulating air duct proper and in the baking space.

Figure 2:
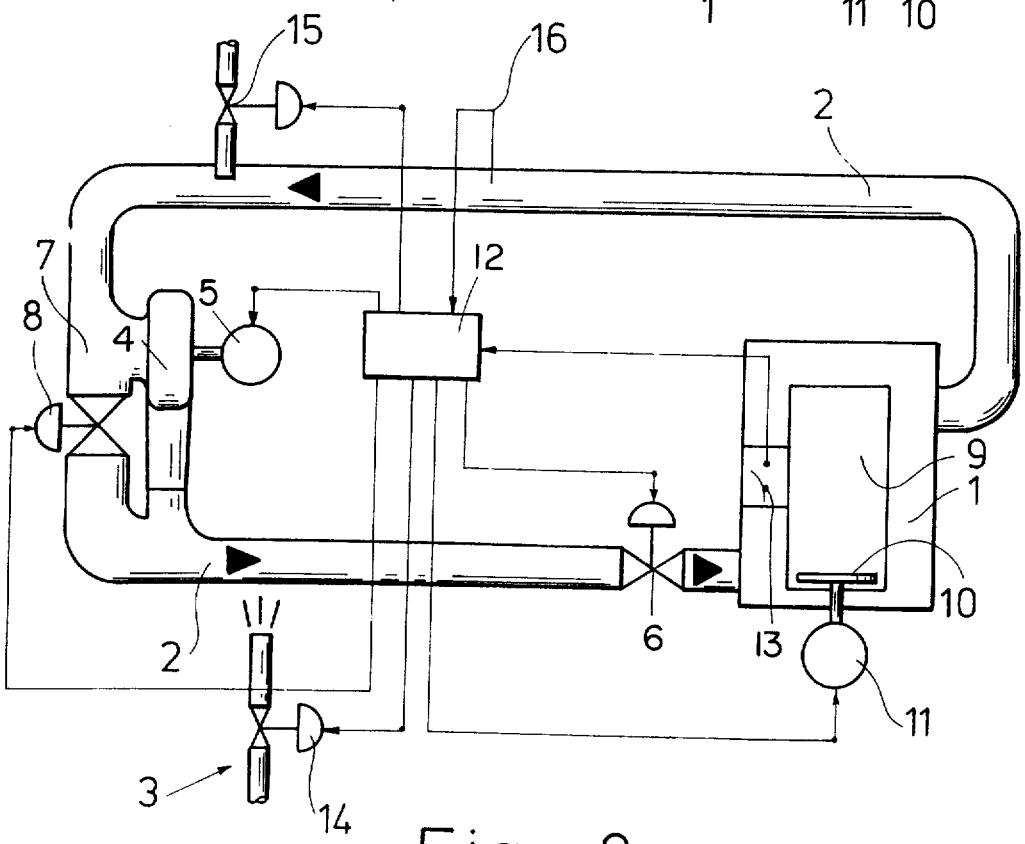

This invention is described in detail in hereafter, with reference to the attached drawing, wherein FIG. 1 presents in the form of a schematic drawing, an embodiment of the invention, and FIG. 2 presents, similarly as a schematic diagram, an automatic circulating air oven according to the invention.

The air space of the circulating air oven consists of the baking space 1 and the circulating air duct 2. The oven furthermore comprises a circulating air heater 3, by the aid of which the air circulated in the air space of the oven by the circulating air blower 4 is heated during the baking of products. In addition, the oven comprises a stand 10, which is rotated during the baking process by a rotating mechanism 11 so that the bakery products on wagons rotating upon the stand will be baked evenly on all sides.

The circulating air oven according to the invention furthermore comprises an air circulation control means, which in FIG. 1 consists of a simple sliding damper 6 and by the aid of which the circulating air duct 2 can be shut off so that the air circulation in the baking space 1 ceases. Hereby the humidity in the baking space is well enough maintained on a high level even if it becomes necessary to open the door 9.

In FIG. 2, to the circulating air duct 2 of the oven according to the invention a by-pass pipe 7 has been added, which connects the delivery and intake sides of the blower 4 with each other, and in said by-pass a shut-off means 8 has been fitted. The said components then constitute in combination a system wherein the air may circulate when the shut-off means 8 is opened, in which case the flow resistance through the by-pass 7 from the delivery side to the intake side of the blower 4 is appreciably less than that from the delivery side to the intake side of the blower along the circulating air duct 2 and through the baking space 1. As a result, the air circulation takes place through the bypass 7, and a control means is not necessarily required at all in the circulating air duct 2 for controlling the air circulation or for stopping it in the baking space 1 when the door is opened.

The circulating air oven presented in FIG. 2 furthermore comprises an automatic govening unit 12, which is connected with a door contact 13 of the baking space 1, with the control means 8 in the by-pass 7, with the air circulation control means 6, with the rotating machinery 11 for the baking stand 10, with the circulating air heater 3, with the drive motor 5 of the circulating air blower 4 and with the automatic valve 15 of a moisture introduction spray. It is possible to connect with the governor unit 12 a program as may be desired, for instance so that on opening the door 9 of the baking space 1 for introduction of loaves into the oven, the control valve 8 opens in the by-pass 7 and the control valve 6 throttles the air flow passing through it, or closes altogether, stopping the circulation of air in the baking space 1, while at the same time the rotating mechanism 11 of the rotatable stand 10 stops. It is then possible to carry out the placing of loaves into the oven without any air circulation present in the baking space and without emergence of air. Hereby the humidity of the baking air will be maintained within desired limits when an oven acccording to the invention is used.

The oven of FIG. 2 furthermore comprises an automatic valve 15 connected to the governing unit 12, for controlling the humidity of the circulating air, and a control means 14 for the heating means 3 for controlling the temperature of the circulating air within desired limits in accordance with pulses delivered by a temperature transducer 16.

It is obvious to one skilled in the art that the invention is not confined to the embodiments presented, but that it may vary within the scope of the patent claims set forth below.

I claim:

1. A circulating air oven for the baking of bakery products in flowing hot air, said oven comprising a baking chamber having an air inlet and outlet, a circulating air duct connected to said chamber at said inlet and outlet thereof, a heater for heating the circulating air in said air duct, a blower in said duct with a drive motor for circulating air through said duct and said baking chamber, and a shut-off means in said duct downstream of the blower for controlling the flow of air circulating to said chamber in order to control the air circulation in said chamber.

2. A circulating air oven according to claim 1 wherein said shut-off means is disposed in said duct proximate said inlet to the chamber.

3. A circulating air oven according to claim 1 wherein said heater is disposed between the blower and said shut-off means.

* * * * *